United States Patent [19]
Yoshimura et al.

[11] Patent Number: 5,677,733
[45] Date of Patent: Oct. 14, 1997

[54] EXPOSURE CONTROL DEVICE HAVING A PLURALITY OF LIGHT DETECTING AREAS

[75] Inventors: Katsuji Yoshimura; Kitahiro Kaneda, both of Kanagawa-ken; Hideo Homma; Kunihiko Yamada, both of Tokyo; Hirofumi Suda; Akihiro Fujiwara, both of Kanagawa-ken, all of Japan

[73] Assignee: Canon Kabushiki Kaisha, Tokyo, Japan

[21] Appl. No.: 190,226

[22] Filed: Feb. 1, 1994

Related U.S. Application Data

[63] Continuation of Ser. No. 897,564, Jun. 11, 1992, abandoned, which is a continuation of Ser. No. 342,130, Apr. 24, 1989, abandoned.

[30] Foreign Application Priority Data

May 2, 1988 [JP] Japan ................................ 63-109644
May 20, 1988 [JP] Japan ................................ 63-123679

[51] Int. Cl.[6] ............................................... H04N 5/232
[52] U.S. Cl. ........................... 348/362; 348/365; 348/169
[58] Field of Search .................................. 348/362, 364, 348/363, 345, 350, 169

[56] References Cited

U.S. PATENT DOCUMENTS

| | | | |
|---|---|---|---|
| 4,382,665 | 5/1983 | Eguchi et al. | 358/227 |
| 4,550,995 | 11/1985 | Toyama | 358/227 |
| 4,644,397 | 2/1987 | Roy et al. | 358/125 |
| 4,713,533 | 12/1987 | Bremer et al. | 250/203.1 |
| 4,774,401 | 9/1988 | Yamada | 250/205 |
| 4,792,820 | 12/1988 | Norita et al. | 354/402 |
| 4,868,871 | 9/1989 | Watson, III | 358/125 |
| 5,023,712 | 6/1991 | Kajiwara | 358/126 |
| 5,272,538 | 12/1993 | Homma et al. | 358/362 |

*Primary Examiner*—Wendy Garber
*Attorney, Agent, or Firm*—Robin, Blecker, Daley & Driscoll

[57] ABSTRACT

An exposure control device having a light measuring area setting circuit which sets a light measuring area on an image sensing plane, a discriminating circuit which discriminates from each other varied states of the image sensing plane through video signal parts corresponding to the inside and the outside of the light measuring area and an exposure compensating circuit which compensates the state of exposure to light is arranged to shift the set position of the light measuring area to trace an object's image at least when the exposure compensating circuit is in operation. The operating modes of the device includes a first light measuring mode in which a quantity of light is measured on the basis of the average video signal level of the whole image sensing plane, a second light measuring mode in which the light quantity is measured with weight attached to a video signal part obtained from the inside of the light measuring area, and a third light measuring mode in which the light quantity is measured with weight attached to the video signal of the light measuring area by shifting the light measuring area to trace the object. The three light measuring modes are adaptively switched from one over to another.

45 Claims, 15 Drawing Sheets

FIG. 4(a)
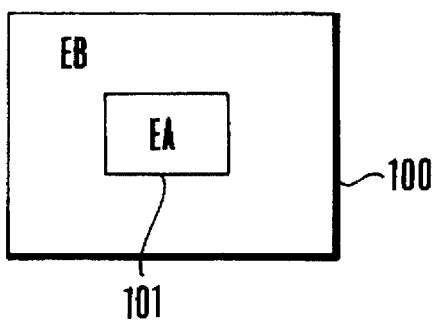
FIG. 4(b)
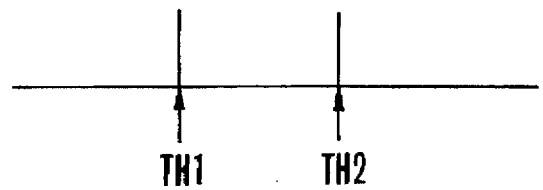
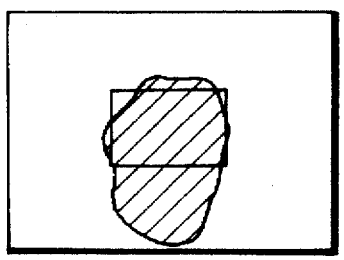
FIG. 5(a)
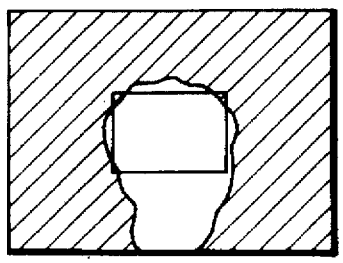
FIG. 5(b)
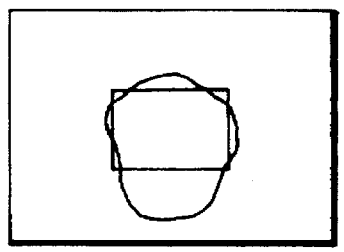
FIG. 5(c)

EXPOSURE CONTROL DEVICE HAVING A PLURALITY OF LIGHT DETECTING AREAS

This is a continuation application under 37 CFR 1.62 of prior application Ser. No. 897,564, filed Jun. 11, 1992, now abandoned, which is a continuation application under 37 CFR 1.62 of prior application Ser. No. 342,130, filed Apr. 24, 1989, now abandoned.

BACKGROUND OF THE INVENTION

1. Field of the Invention

This invention relates to an automatic exposure control device highly suited for a video camera or like apparatus.

2. Description of the Related Art

The apparatuses of the kind automatically performing exposure control such as a video camera or the like are generally arranged to feedback control the iris of an optical system and an automatic gain control (AGC) circuit in such a way as to keep a video signal at a constant level.

FIG. 1 of the accompanying drawings shows in a block diagram the typical arrangement of the conventional automatic exposure control device used for a video camera. The illustration includes; a photo-taking lens 1; an exposure control part 2 including an iris which is arranged to control the quantity of incident light coming through the phototaking lens 1; an image sensor 3 which is a CCD or the like and is arranged to photo-electric convert information on an image formed on the image sensing plane thereof through the photo-taking lens 1 and to produce an image signal; an amplifier 4 which is disposed on the output side of the image sensor 3 and which includes a buffer amplifier and an AGC circuit or the like; and a signal processing circuit 5. The signal processing circuit 5 is arranged to convert a video signal output from the buffer amplifier 4 into a standard signal form of, for example, the NTSC system by performing a signal processing operation including a gamma correction process, a blanking process and a synchronizing signal adding process. The signal is thus converted into a signal form suited for a monitor display or a video recorder which is not shown and is output from a video output terminal. A signal level detecting circuit 6 is arranged to detect the level of the video signal output from the amplifier 4 and to feedback information on the detected signal level as a control signal to the exposure control part 2 and the AGC circuit, etc., included in the amplifier 4 in such a way as to keep the video signal at a predetermined level. This arrangement enables automatic exposure control to be carried out to keep the video signal at a desired level.

However, in the event of a great difference in luminance between an object to be photographed and the background thereof, this arrangement causes the image of the object to be darkened all over under a back-lighting condition or to be washed out under a normal lighting condition. The image then appears unnatural.

To solve this problem, a weighted light measuring method of measuring the light of the image sensing plane by attaching weight to a part thereof is employed. In accordance with the weighted light measuring method, a light measuring frame is set in the central portion of the image sensing plane. The inside of this frame is used as a light measuring area. The exposure control is performed always to make an exposure appositely to an object located within the light measuring area.

FIG. 2 shows in a block diagram the arrangement made in accordance with the above-stated weighted light measuring method. The arrangement differs from the device of FIG. 1 in the following point: in order to supply the signal level detecting circuit 6 with only a portion of the video signal corresponding to the inside of the light measuring frame located in the central portion of the image sensing plane, the arrangement of FIG. 2 includes a gate circuit 30 which is arranged to selectively gate the video signal to be supplied from the amplifier 4 to the signal level detecting circuit 6; and a gate pulse generating circuit 31 which is arranged to generate, in accordance with a synchronizing signal SYNC, a gate pulse for controlling the gate circuit 30 in such a way as to pass only the signal of the inside of the light measuring frame through the gate circuit 30. That arrangement enables the automatic exposure control to be accomplished in such a way as to ensure an exposure apposite to the object's image located within the light measuring frame without being affected by the background.

However, in the conventional device arranged to carry out the above-stated weighted light measuring method (hereinafter referred to as the frame weighted light measuring method), the position of the light measuring area (or frame) is fixed on the image sensing plane. Besides, the exposure control is performed only for back-lighting compensation and wash-out compensation. Hence, the conventional arrangement for the frame-weighted light measurement has presented the following problems:

i) When the object's image comes out of the light measuring frame due to a movement of the object relative to the camera, the brightness within the light measuring area changes. Exposure compensation is, therefore, effected according to this change. As a result, the brightness of the whole image sensing plane is caused to change. At the same time, the brightness of the object's image also comes to change to give a very unnatural impression, and ii) A faulty operation might result from erroneous recognition of the object.

In view of these problems, it has been desired to have the exposure control accomplished appositely to any of varied conditions of the image sensing plane.

Further, the exposure control device for a video camera is arranged to adjust the amount of incident light by automatically controlling an iris according to the photographing conditions, particularly according to illuminance. The exposure control device detects the quantity of light through the level of a luminance signal included in a video signal and controls the iris in such a way as to make the luminance level constant.

Meanwhile, a tracing type light measuring method has been disclosed in U.S. patent application Ser. No. 07/264, 204, filed on Oct. 28, 1988 now abandoned. In accordance with this method; the exposure control device is arranged to detect a difference in average video signal level between a video signal part obtained from the outside of a designated area of an image sensing plane and another video signal part obtained from the inside of the designated area; the position of the designated area is shifted in such a way as to bring the difference to a maximum difference value; and the quantity of light is detected on the basis of the video signal obtained from the inside of the movable designated (light measuring) area. The tracing type light measuring method is based on the assumption that there is a salient difference in level between a video signal for an object to be photographed and a video signal for the background of the object in General. Therefore, in cases where the video signal level difference between the object and the background is small, the small difference lowers the object tracing accuracy of an exposure control device arranged to operate in accordance with this method.

SUMMARY OF THE INVENTION

The present invention is directed to the solution of the above-stated problems of the prior art. It is therefore a first object of the invention to provide an exposure control device which is capable of performing exposure control always appositely to the condition of the image sensing plane of an image sensor.

It is a second object of the invention to provide an exposure control device which is capable of performing exposure control appositely to an object to be photographed even when the object moves.

It is a third object of the invention to provide an exposure control device which is arranged to automatically determine, through a video signal, whether the object to be photographed requires back-lighting compensation or wash-out compensation and to have the position of a light measuring area shifted to trace a dark object for the back-lighting compensation or to trace a white object for the wash-out compensation, so that exposure control can be accomplished always in an optimum manner.

Under this object, an automatic exposure control device arranged according to this invention as a preferred embodiment thereof comprises light measuring area setting means for setting a light measuring area on an image sensing plane; discriminating means for discriminating a state of the image sensing plane on the basis of video signals corresponding to the inside and the outside of the light measuring area; exposure compensating means for making compensation for exposure conditions on the basis of the result of a discrimination made by the discriminating means; and tracing means for causing a position of the light measuring area to be shifted from a previously set position to a further position to trace an object to be photographed at least for a period during which the exposure compensating means is in operation.

It is a fourth object of the invention to provide an exposure control device which is capable of automatically carrying out back-lighting compensation or wash-out compensation by discriminating the state of an object and that of the background thereof from each other; is capable of keeping the camera in an apposite exposure state; and is capable of continuously performing adequate exposure control in real time by causing a light measuring area to trace the object even when the object moves.

It is a fifth object of the invention to provide an exposure control device which is capable of adequately performing object tracing type exposure control according to the state of an image sensing plane.

It is a sixth object of the invention to provide an exposure control device of an object tracing type which is capable of adequately operating according to the situation of a photographing object even in the event of a small difference in video signal level between the object and the background thereof.

It is a seventh object of the invention to provide an exposure control device which is capable of performing exposure control always appositely to the photographing conditions; the device being arranged to perform weighted light measurement for attaching weight to a photographing object by tracing the object only in a case where a brightness difference between the object and the background thereof is relatively large to permit a tracing action on the object; and to perform, in cases where the brightness difference between the object and its background is too small for tracing the object, either center-weighted or whole-plane average light measurement according to the degree of the brightness difference without tracing the object.

Under that object, an exposure control device arranged according to the invention as another preferred embodiment thereof comprises first light measuring means for measuring a quantity of light according to an average level of a video signal obtained from the whole of an image sensing plane; second light measuring means for measuring a quantity of light by attaching weight to a video signal obtained from the inside of a light measuring area set in a predetermined position on the image sensing plane; and third light measuring means for measuring a quantity of light by attaching weight to a video signal obtained from the inside of the light measuring area while the light measuring area is moved to trace an object to be photographed. One of the three light measuring means is used by adaptively switching them from one over to another. When a luminance level difference between the video signals obtained from the inside and the outside of the light measuring area is above a predetermined value, the quantity of light is measured by the third light measuring means, so that the quantity of light can be measured appositely to a movement of the object. If the luminance level difference is a little smaller than the predetermined value, the center-weighted light measurement is performed by the second light measuring means. In a case where the level difference is much smaller than the predetermined value, the whole-plane average light measurement is performed by the first light measuring means.

The above and other objects and features of the invention will become apparent from the following detailed description of embodiments thereof taken in conjunction with the accompanying drawings.

BRIEF DESCRIPTION OF THE DRAWINGS

FIGS. 4(a) and 4(b) show areas of the inside and the outside of a light measuring frame set on an image sensing plane.

FIGS. 5(a), 5(b) and 5(c) show different states of the image sensing plane.

DETAILED DESCRIPTION OF THE PREFERRED EMBODIMENTS

Figure 1:
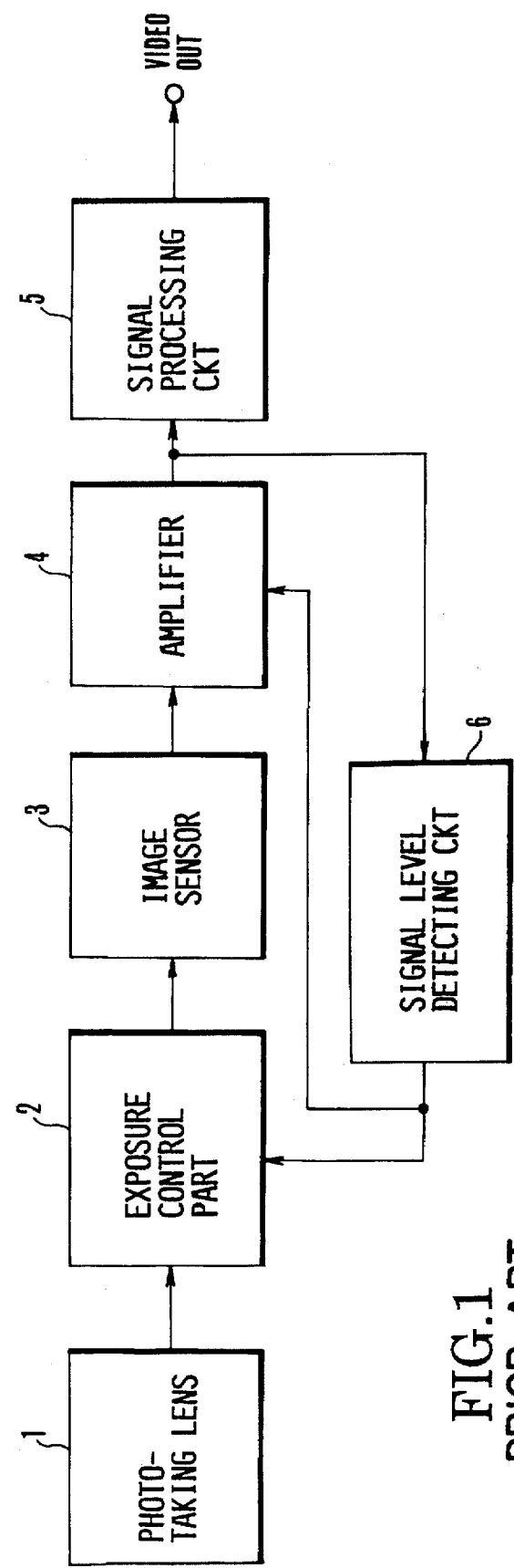
FIGS. 1 and 2 are block diagrams showing the conventional automatic exposure control circuits.
Figure 2:
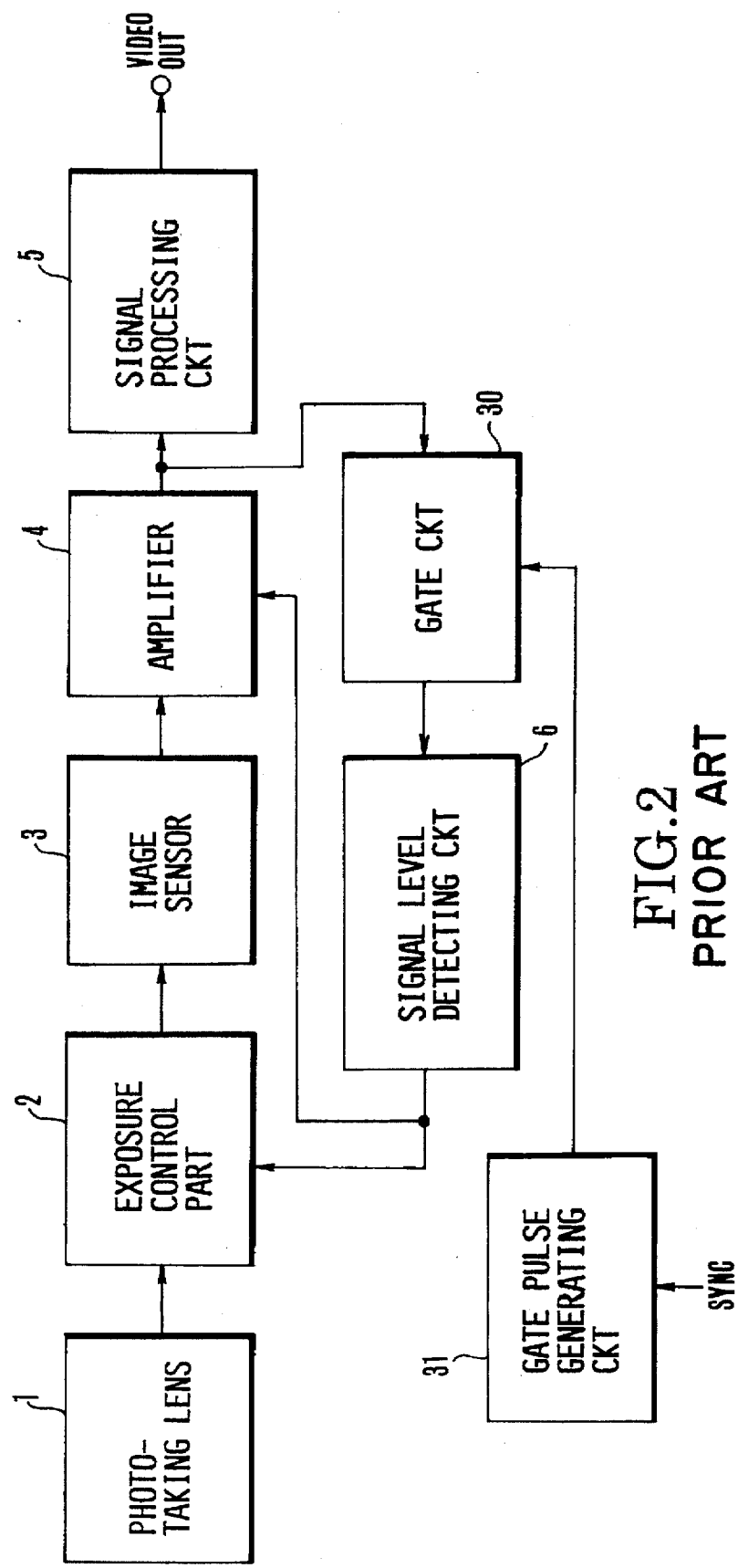

The details of the automatic exposure control device according to this invention will be understood from the description of preferred embodiments given below with reference to the accompanying drawings, wherein the same component parts as those shown in FIGS. 1 and 2 are indicated by the same reference numerals.

Figure 3:
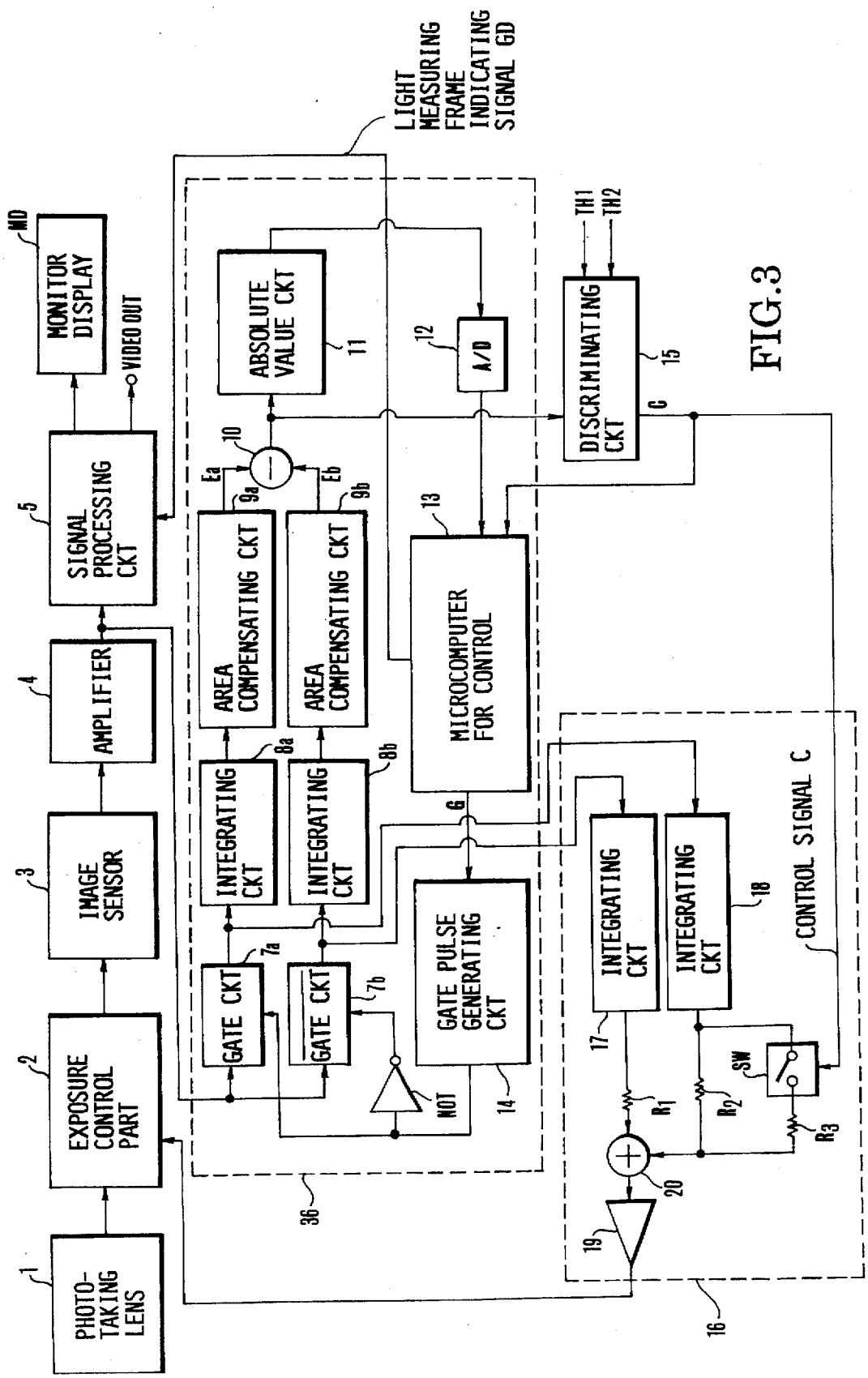
FIG. 3 is a block diagram showing an automatic exposure control device arranged according to this invention as a first embodiment thereof.

Referring to FIG. 3 which shows the arrangement of a first embodiment of the invention, the illustration includes a photo-taking lens 1, an exposure control part 2, an image sensor 3, an amplifier 4 and a signal processing circuit 5 which are arranged individually in the same manner as the corresponding parts of FIGS. 1 and 2. A reference symbol MD denotes a monitor display of a video signal output from the signal processing circuit 5.

A block 36 defined by a broken line represents a light measuring frame (area) setting circuit. The circuit 36 is arranged to set on an image sensing plane 100 a light measuring frame 101 with inside and outside areas EA and EB located respectively inside and outside the frame 101 as shown in FIG. 4(a). Gate circuits 7a and 7b are arranged to pass a video (image) signal (or a luminance signal) corresponding to a designated area on the image sensing plane 100 in accordance with a gate pulse output from a gate pulse generating circuit 14. The gate circuit 7a is arranged to pass a video signal corresponding to the inside area EA of the light measuring frame 101. Meanwhile, the other gate circuit 7b receives from an inverter NOT a signal obtained by inverting the gate pulse output from the gate pulse generating circuit 14, so that the gate circuit 7b passes a video signal corresponding to the outside area EB located outside the light measuring frame 101 set on the image sensing plane 100. Integrating circuits 8a and 8b are arranged to integrate for one field period the video signals obtained from the inside and the outside of the light measuring frame 101 and output respectively from the gate circuits 7a and 7b. Area compensating circuits 9a and 9b are arranged to normalize the integrated values of the signals output from the integrating circuits 8a and 8b with the area values of these areas respectively. The area values of the areas EA and EB located inside and outside the light measuring frame 101 differ from each other. The integration outputs of the integrating circuits 8a and 8b, therefore, cannot be compared with each other as they are. Hence, these integrated signal values are normalized by using the area values of the areas from which they are obtained respectively. They are thus converted into average luminance levels by the area compensating circuits 9a and 9b for comparison. Hereinafter, the average luminance levels of these areas are referred to as levels Ea and Eb respectively.

A subtraction circuit 10 is arranged to obtain, through a subtracting operation, a difference between the integrated values of the luminance signals output from the area compensating circuits 9a and 9b and obtained from the inside and the outside of the light measuring frame 101. An absolute value circuit 11 is arranged to obtain the absolute value of the difference between the average luminance levels Ea and Eb of the areas EA and EB located inside and outside the light measuring frame 101. An analog-to-digital (A/D) converter 12 is arranged to convert the output of the absolute value circuit 11 into a digital value. A microcomputer 13 which is provided for control is arranged to control the position of the light measuring frame 101 on the image sensing plane 100 by controlling the gate pulse generating circuit 14 on the basis of the digital absolute value of the luminance difference between the light measuring areas EA and EB and the result of a discrimination made by a discriminating circuit 15 which will be described later. The gate pulse generating circuit 14 is controlled by the microcomputer 13 in such a way as to have the luminance difference at a maximum value. In accordance with an instruction from the microcomputer 13, the gate pulse generating circuit 14 changes the gate pulse generation timing thereof so that position of the light measuring frame 101 set on the image sensing plane 100 can be changed with the applicable gate passing video signal portion changed accordingly. Further, the microcomputer 13 produces a light measuring frame indicating signal GD for displaying the position of the light measuring frame 101 on the monitor display MD. The signal GD is supplied to the signal processing circuit 5 from the microcomputer 13.

Within the image sensing plane, a portion of the image sensing plane having the image of a main photographed object generally has a higher luminance level (more high-frequency component) than a portion having the image of the background of the main object. When the main object is seized within the light measuring frame 101, the luminance difference between the inside and the outside of the frame 101 becomes a maximum value. Therefore, the main object can be best seized by controlling and shifting the position of the light measuring frame 101 to such a position that gives the maximum luminance difference between the inside and the outside of the frame 101 as the frame is caused to follow the movement of the object by such a shifting action.

A tracing operation algorithm for controlling. the position of the light measuring frame 101 in such a way as to have the maximum value of difference between the average luminance levels Ea and Eb of the areas EA and EB located inside and outside the light measuring frame 101 will be described later.

The discriminating circuit 15 is arranged to compare the luminance difference Ea–Eb between the inside and outside areas EA and EB of the light measuring frame 101 with predetermined threshold levels TH1 and TH2 (TH1<TH2) shown in FIG. 4(b). The circuit 15 then determines the state of the image sensing plane as to whether it requires back-lighting compensation or wash-out compensation or as to whether averaging light measurement should be performed. As a result of the determination, a control signal C is output from the discriminating circuit 15 for controlling the operation of an analog switch SW.

In cases where the average luminance level Ea of the area EA located inside the light measuring frame 101 is found to be lower than the average luminance level Eb of the area EB located outside the frame 101 and there obtains a relation of Ea–Eb<TH1 or where the level Ea is higher than the level Eb and there obtains a relation of TH2<Ea–Eb, the discriminating circuit 15 produces the control signal C at a high level. If the average luminance levels Ea and Eb of the areas EA and EB located inside and outside the light measuring frame 101 are in a relation TH1≦Ea–Eb≦TH2, the circuit 15 produces the control signal C at a low level.

A light measuring circuit 16 is arranged to produce, on the basis of the result of determination made by the discriminating circuit 15, information on a light measuring video signal level and to feed it back to the exposure control part 2. The light measuring circuit 16 includes an integrating circuit 17 which is arranged to integrate, for a given period of time (one field period), a video signal obtained from the area EB located outside the light measuring frame 101 and output from the gate circuit 7b and to average the integrated video signal; another integrating circuit 18 which is arranged to integrate, for the same period of time, a video signal obtained from the area EA located inside the light measuring frame 101 and output from the gate circuit 7a and to average the integrated video signal; a buffer amplifier 19; an analog switch SW which operates under the control of the control signal C output from the discriminating circuit 15 and is arranged to turn on when the control signal C is at a high level and to turn off when the signal C is at a low level; resistors R1 to R3 which are arranged to be used for attaching weight to signals obtained from the inside and the outside of the light measuring frame 101 in controlling the video signal level to be fed back to the exposure control part 2 via the buffer amplifier 19; and an adder 20.

With the embodiment arranged as described above, the video signal, or the luminance signal, is supplied to the gate circuits 7a and 7b to be separately taken out as a signal Ea which corresponds to the inside area EA of the light measuring frame 101 and a signal Eb which corresponds to the outside area EB of the frame 101. Then, as mentioned in the foregoing, the average luminance levels of these signals Ea and Eb are obtained through the integrating circuits 8a and 8b and the area compensating circuits 9a and 9b. A difference between these levels is obtained by the subtraction circuit 10. The difference Ea–Eb between the average luminance levels of the areas EA and EB thus obtained is supplied to the discriminating circuit 15 to be used for determining the state of the image sensing plane.

In cases where there is not much difference between the average luminance levels Ea and Eb of the inside and outside areas EA and EB and the brightness level of the whole image sensing plane is nearly uniform as shown in FIG. 5(c), that is, in a case where the relation of the average luminance level difference Ea–Eb to the predetermined threshold levels TH1 and TH2 is TH1≦Ea–Eb≦TH2, the discriminating circuit 15 produces the control signal C at a low level to open the analog switch SW which is disposed within the light measuring circuit 16.

Then, the video signals which correspond to the inside and outside areas EA and EB of the light measuring frame 101 and which are separately extracted by the gate circuits 7a and 7b are integrated and averaged respectively by the integrating circuits 17 and 18. The averaged signals are respectively weighted to predetermined degrees by means of resistors R1 and R2 (in actuality, a greater weight is attached to the signal of the inside area EA of the light measuring frame). The signals thus weighted are added together by the adder 20. The output of the adder 20 is supplied via the buffer amplifier 19 to the exposure control part 2 as an exposure control signal. The exposure control part 2 is feedback-controlled by this signal on the basis of the average luminance level of the whole image sensing plane 100 and there obtains the whole-plane average light measurings mode of the embodiment. In the case of the average light measuring mode of this invention, the weight attaching rate difference between the inside and the outside of the light measuring frame is arranged to be smaller than the frame-weighted light measuring mode. In actuality, however, the rate of weight attached to the inside of the frame may be increased for frame-weighted light measurement.

In a case where the discriminating circuit 15 determines the image sensing plane to be in a back-lighting state wherein the average luminance level of the outside area EB of the light measuring frame 101 is higher than that of the inside area EA of the frame 101, as shown in FIG. 5(a), and there obtains a relation of Ea–Eb<TH1, the discriminating circuit 15 produces the control signal C at a high level to cause the analog switch SW to close.

With the switch SW closed, another resistor R3 is connected in parallel to the resistor R2 which is arranged to attach weight to the luminance signal corresponding to the inside area EA of the light measuring frame 101. Then, compared with the whole-plane average light measurement mode mentioned in the foregoing, a smaller resistance value is obtained. As a result, the voltage drop of the output of the integrating circuit 18 becomes smaller. The weight attaching rate of voltage addition to the signal of the inside area EA of the frame 101 increases compared with voltage addition to the signal of the outside area EB of the frame 101. The luminance signal level of the inside area EA of the light measuring frame 101 is thus reflected to a greater degree to bring about the frame-weighted light measuring mode. Therefore, the so-called back-lighting compensation is effected with the exposure compensated for the object's image part which is darker than the background part.

In the event of the so-called washed-out state, the discriminating circuit 15 finds that the average luminance level Ea of the area EA located inside the light measuring frame 101 is higher than the average luminance level Eb of the outside area EB and there obtains a relation of TH2<Ea–Eb, as shown in FIG. 5(b). In that event, the discriminating circuit 15 produces the control signal C at a high level to cause the switch SW to close in the same manner as in the case of the above-stated back-lighting compensation. The weighted degree of the signal for the inside area EA of the frame 101 increases and there obtains the frame-weighted light measuring mode. Therefore, the so-called wash-out compensation can be carried out by correcting the exposure for the object which is very bright in contrast with the background thereof and is in the washed-out sate.

As described above, when the difference in luminance between the areas located inside and outside the light measuring frame is not much, the embodiment performs whole-plane average light measurement irrespectively of the degree of the luminance levels. Then, the exposure is controlled on the basis of the averaged luminance level value of the whole image sensing plane.

In the event of a great luminance difference between the inside and the outside of the light measuring frame set on the image sensing plane requiring either the back-lighting compensation or the wash-out compensation, the frame-weighted light measurement is performed to correct the unnaturalness of the image sensing plane by making exposure compensation with weight attached to the main object to be photographed.

While the exposure control arrangement of the automatic exposure control device according to this invention is as described above, the device has an automatic tracing function as first mentioned in the foregoing. When either a movement of the object or that of the camera causes the image of the object to move from the inside to the outside of the light measuring frame, the embodiment is capable of shifting the frame to follow up (track) the object's image with the position of the object's image detected through the luminance difference between the object and its background by virtue of the automatic tracing function. Therefore, as long as there is a difference in luminance between the inside area EA and the outside area EB of the light measuring frame 101, the position of the frame 101 is shifted in the direction in which the luminance difference becomes greater, i.e. in such a way as to seize the object within the frame 101. Such being the arrangement of the embodiment, the back-lighting compensation for the image sensing plane of FIG. 5(a) and the wash-out compensation for the image sensing plane of FIG. 5(b) can be adequately accomplished even when the object is moving without bringing about any unnatural change on the image sensing plane under an exposure. Further, in cases where the luminance difference between the inside and the outside of the light measuring frame 101 is too small for the tracing shift of the frame 101, the average light measurement is accomplished on the basis of the average luminance level of the image sensing plane. Therefore, in such a case, the exposure control can be accomplished without tracing the object with the light measuring frame.

Next, a tracing algorithm which is to be carried out by means of the control microcomputer 13 for automatically tracing the object with the light measuring frame 101 is as described below with reference to FIGS. 6 and 7.

Figure 6:
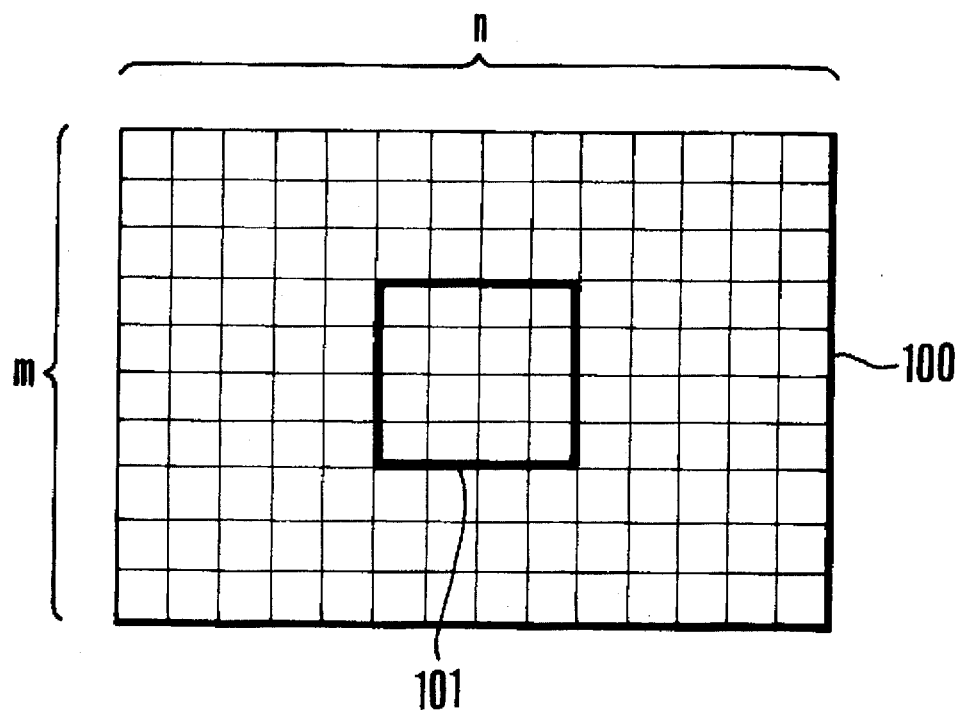
FIG. 6 shows an image sensing plane for explaining the tracing action of the light measuring frame.
Figure 7A:
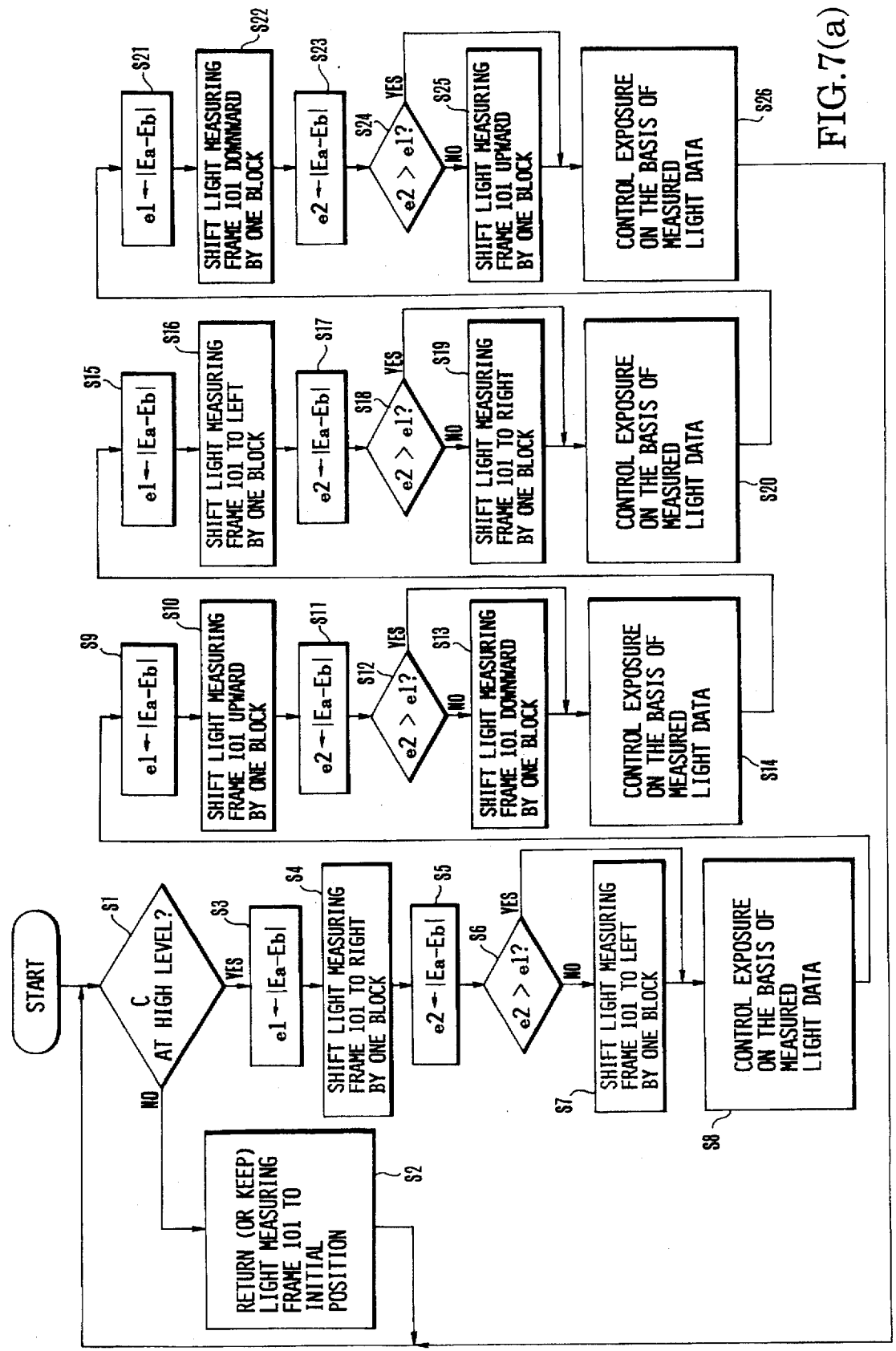
FIGS. 7(a), 7(b) and 7(c) are flow charts for explaining the tracing action.

Referring to FIG. 6, the image sensing plane 100 is divided into m×n blocks for the purpose of setting the unit amount of change in the position of the frame 101. In accordance with this invention, the light measuring frame 101 is arranged to be shiftable upward, downward, to the left and to the right by one block at a time. The control algorithm is set as follows:

FIG. 7(a) shows the control operation in a flow chart. At a step S1 after the start of the tracing action, the control microcomputer 13 checks the control signal C of the discriminating circuit 15 for the level thereof. If the control signal C is found to be at a low level, the computer 13 assumes the luminance difference between the inside and the outside of the light measuring frame 101 to be too small for the tracing action and the flow of operation proceeds to a step S2. At the step S2, the frame 101 is either kept in the current position thereof or is brought back to its initial position which is in the central part of the image sensing plane. After that, the flow comes back to the step S1. In a case where the level of the control signal C is found to be high at the step S1, the computer 13 assumes the luminance difference between the inside and the outside of the frame 101 to be significant. Then, control over the position of the light measuring frame 101 begins.

At a step S3, the output |Ea−Eb| of the absolute value circuit 11 is stored in the storage of a variable e1. At a step S4, the light measuring frame 101 is shifted to the right by one block as viewed on FIG. 6. The flow then comes to a step S5. At the step S5: The output |Ea−Eb| of the absolute value circuit 11 obtained after the shift of the frame 101 to the new position is stored in the storage of a variable e2. At a step S6: The contents of the variable storages e2 and e1 are compared with each other. If the former is thus found to be larger than the latter, it indicates an increase in the luminance difference resulting from the rightward shift of the frame 101. Since this means that the object's image is adequately seized within the frame 101, the flow comes to a step S8. At the step S8: Light measurement is performed with the frame 101 in that position. The exposure control part 2 is driven to perform exposure control by controlling the iris, the AGC circuit, etc., on the basis of the result of the light measurement.

If the content of the variable storage e2 is found not larger than that of the variable storage e1 at the step S6, the flow comes to a step S7 to shift the light measuring frame 101 to the left by one block in such a way as to bring it back to its initial position. After that, the flow comes to the step S8 to drive the exposure control part 2 to perform exposure control on the basis of the result of light measurement performed with the frame 101 in the above-stated position.

At ensuing steps S9 to S14: The position of the light measuring frame 101 is shifted upward by one block on the image sensing plane 100 as viewed on FIG. 6. Then, exposure control is performed in the same manner as the preceding steps S3 to S8. In other words, light measurement is performed with the light measuring frame 101 set in a new position if the luminance difference between the inside and the outside of the frame 101 increases in the new position; or, if not, the light measurement is performed with the frame 101 shifted back to its initial position from the new position.

The light measuring frame 101 is likewise shifted to the left by one block at steps S15 to S20 and downward by one block at steps S21 to S26. The position of the light measuring frame 101 is set either in its initial position or in its new position, whichever gives a greater luminance difference. After completion of exposure control performed with the frame 101 set in one of these variable positions, the flow comes back to the step S1 to repeat the above-stated steps of operation as long as the luminance difference is above a predetermined level.

The embodiment is thus arranged to be capable of having the position of the light measuring frame 101 kept adjusted to the object's image as long as the luminance difference between the inside and the outside of the frame 101 is above the predetermined level even when the object moves. Therefore, the video signal level obtained from the inside of the light measuring frame 101 can be measured with weight attached thereto.

Further, while the light measuring frame is used also as a tracing frame in the embodiment described above, the same advantageous effect of the invention is attainable also by separately arranging a light measuring frame and a tracing frame.

Figure 7B:
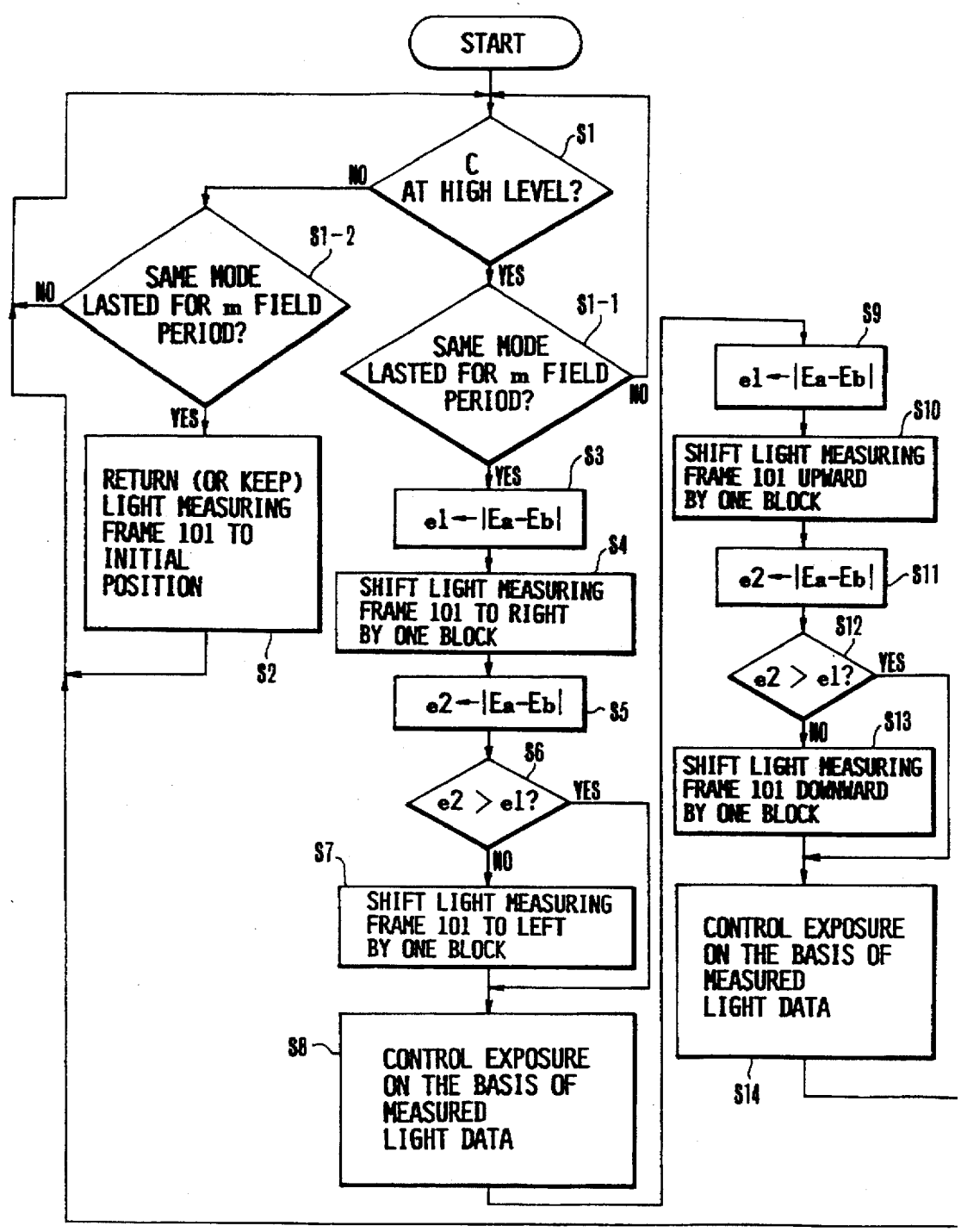
Figure 7C:
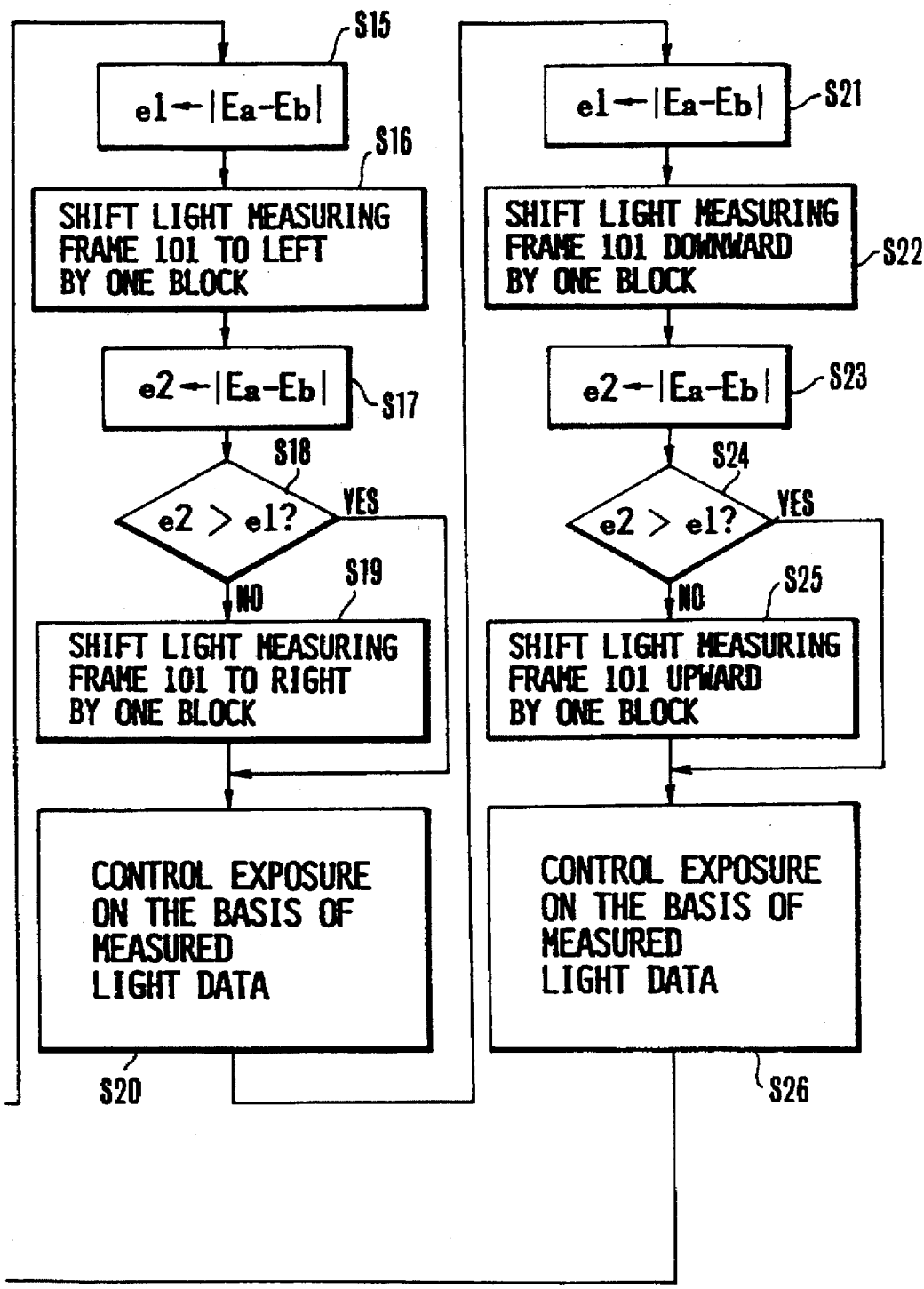

Further, to prevent occurrence of any transient variations of the luminance difference between the inside and the outside of the light measuring frame 101 and any noise during the process of discriminating the state of the image sensing plane at the step S1 of the flow chart of FIG. 7(a), an additional step S1-1 may be inserted in between the steps S1 and S3 and another additional step S1-2 in between the steps S1 and S2 as shown in FIGS. 7(b) and 7(c). At each of these additional steps S1-1 and S1-2, the tracing mode is changed only after the same tracing mode has lasted over a period of m fields (several field periods, for example). If the same tracing mode has not lasted for m fields, the determination made at the step S1 is considered to be a momentary noise and the tracing mode is not changed. This arrangement further increases the stability of the operation.

Figure 8:
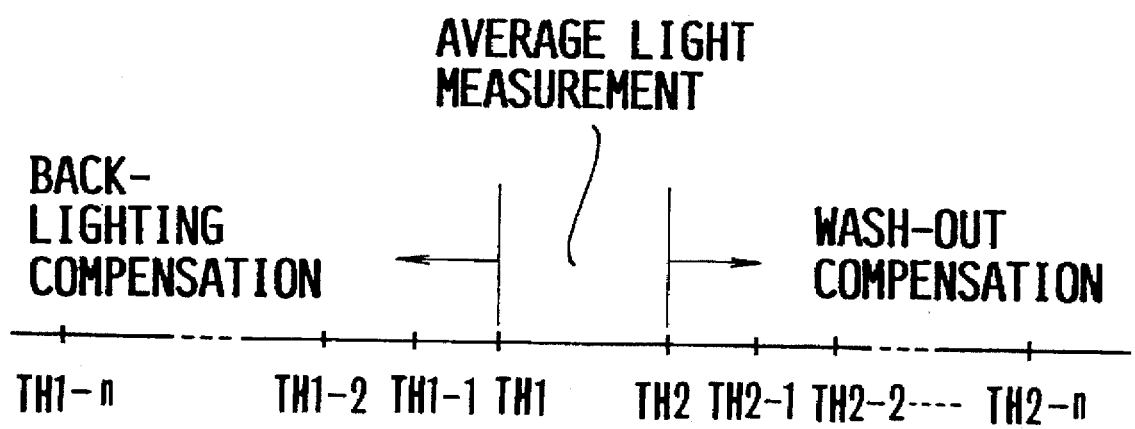
FIG. 8 shows a diagram for explaining a light measuring circuit which is arranged as a second embodiment of the invention.

In the first embodiment described, the weight to be attached to the inside of the light measuring frame in carrying out the wash-out or back-lighting compensation during the process of exposure control is arranged to be variable in two steps. However, this arrangement may be changed as follows: in the cases of a back-lighting state as shown in FIG. 5(a) and a washed-out state as shown in FIG. 5(b), the value Ea−Eb is arranged to be compared with an n number of threshold values including TH1-1, TH1-2, ... and TH1-n and TH2-1, TH2-2, ... and TH2-n as shown in FIG. 8 which shows the light measuring modes of a second embodiment of the invention. This arrangement enables the light measuring circuit to have the degree of compensation more finely controlled in n steps according to the result of comparison.

Figure 9:
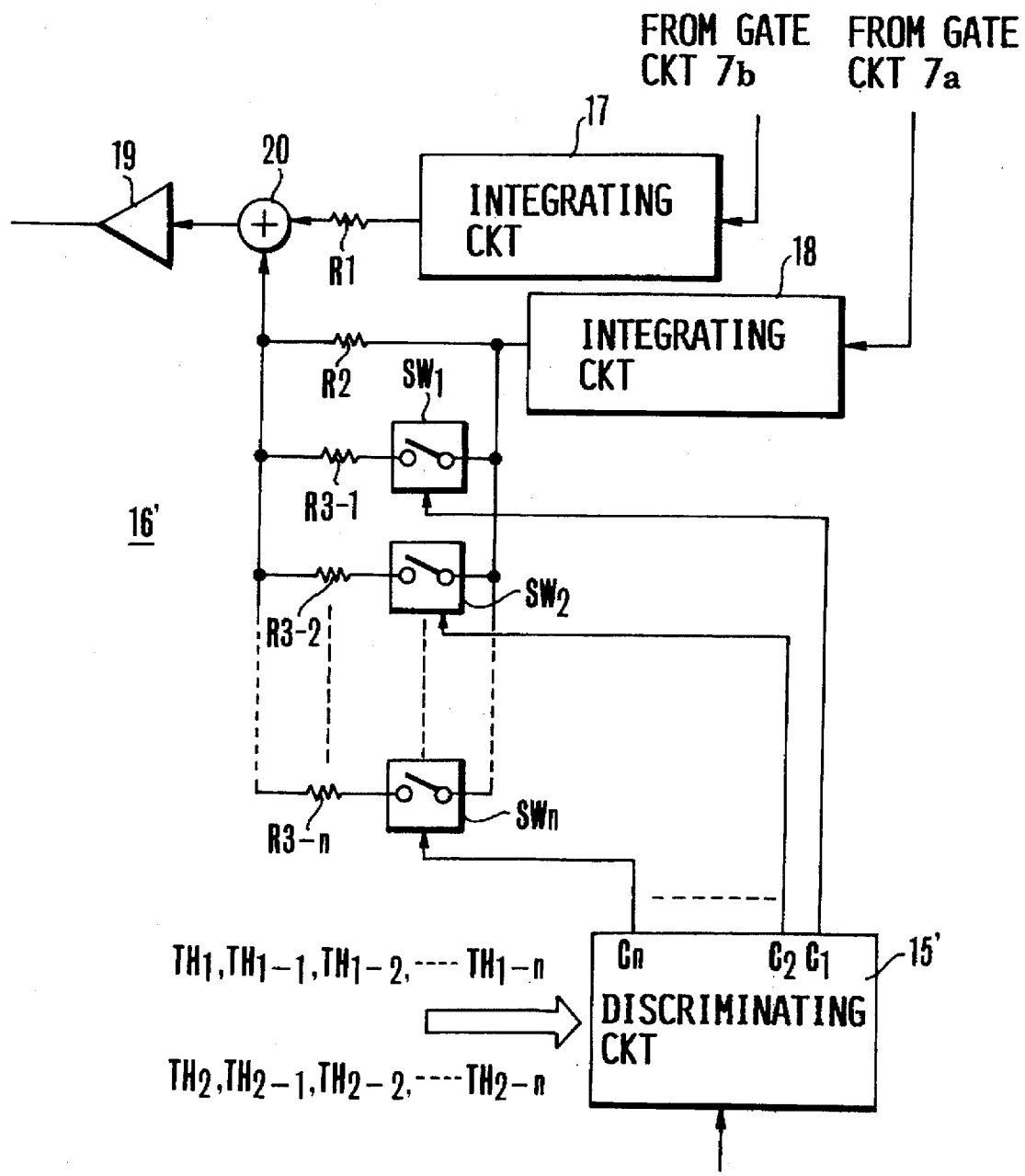
FIG. 9 shows in a block diagram the light measuring circuit of the second embodiment of the invention.

FIG. 9 shows a light measuring circuit 16' which is arranged to perform light measurement in the above-stated manner. In FIG. 9, the same component parts as those shown in FIG. 3 are indicated by the same reference numerals. An n number of series circuits consisting of resistors R3-1, R3-2, . . . and R3-n and switches SW1, SW2, . . . and SWn are connected in parallel respectively to the resistor R2 which is arranged to attach weight to the luminance signal obtained from the inside area EA of the light measuring frame 101. The resistance value of each resistor can be suitably set according to a weight changing rate designed.

A discriminating circuit 15' which controls the opening and closing actions of these switches SW1, SW2, . . . and SWn is arranged as follows: in both cases of the back-lighting compensation (EA-Eb<TH1) as shown in FIG. 5(a) and the wash-out compensation (Ea-Eb>TH2) as shown in FIG. 5(b), the luminance level difference Ea-Eb which is output from the subtraction circuit 10 is compared with threshold level values TH1, TH1-1, TH1-2, . . . and TH1-n, TH2, TH2-1, TH2-2, . . . and TH2-n respectively in an n number of steps. Then, in accordance with the result of the comparison, the level of one of control signals C1 to Cn is changed to a high level to control thereby the resistance parallel-connected to the resistor R2. The weight to be attached to the signal for the inside of the light measuring frame 101 is thus controlled in n steps for highly accurate, highly sensitive exposure control.

Figure 10:
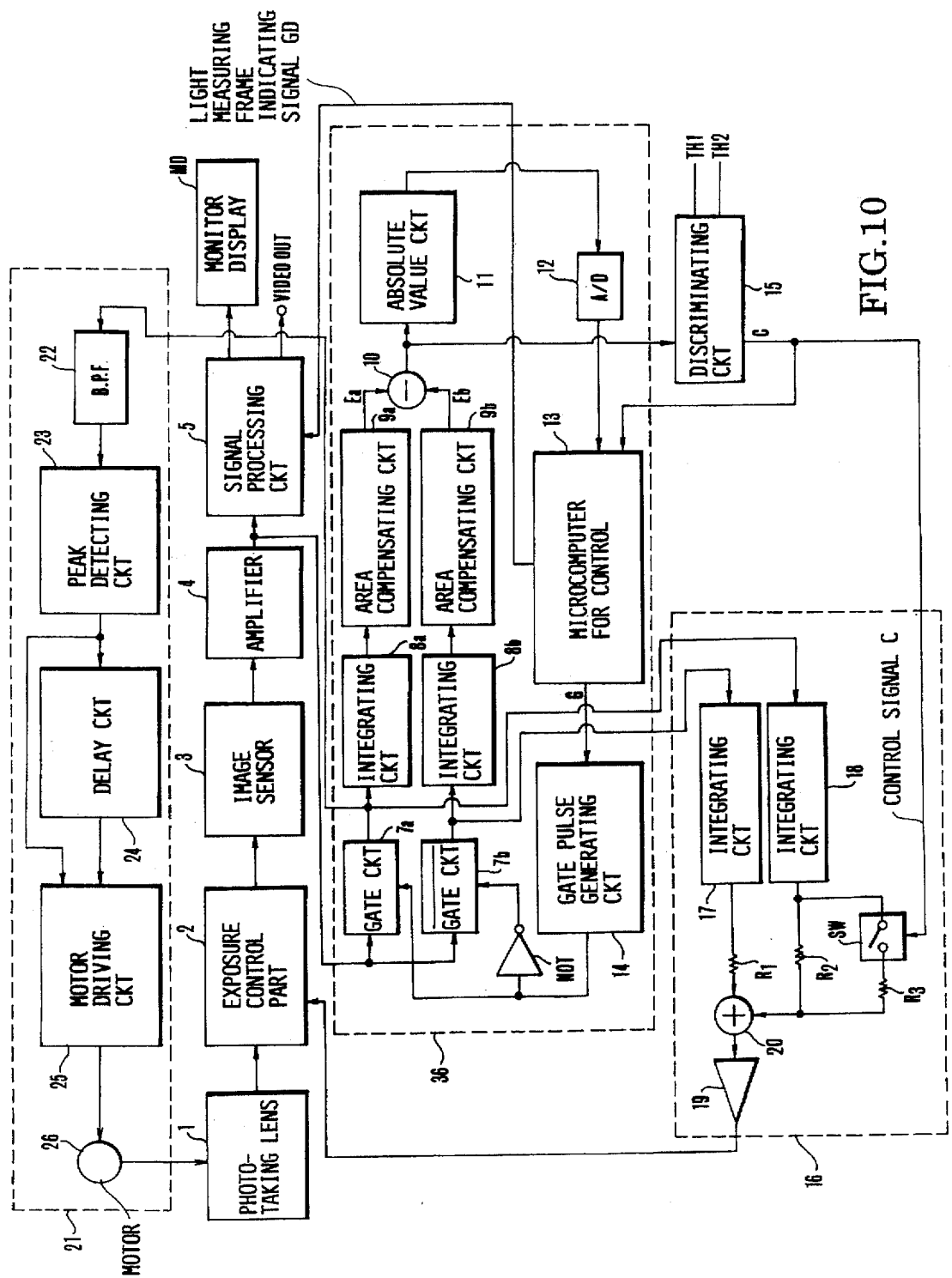
FIG. 10 is a block diagram showing a third embodiment of the invention wherein an automatic focusing device is arranged in combination with an automatic exposure control device arranged according to the invention.

FIG. 10 shows an automatic exposure control device arranged as a third embodiment of this invention. In this case, in addition to the function of tracing a moving object with the light measuring frame 101, the automatic exposure control device is provided with a function of following (or tracing) the moving object with the focal point of a photo-taking lens. The following description covers only the parts of the third embodiment differing from the arrangement of FIG. 3.

Referring to FIG. 10, an automatic focus adjusting device 21 comprises a motor 26 which is provided for adjusting the focal point of the photo-taking lens 1 by shifting the position of the lens 1; a band-pass filter (BPF) 22 which is arranged to extract a high-frequency component from a luminance signal corresponding to the inside area EA of the light measuring frame 101; peak detecting circuit 23 which is arranged to detect and hold the peak of the signal output from the BPF 22 obtained during one field period; a delay circuit 24 which is arranged to delay the output of the peak detecting circuit 23 for one field period; and a motor driving circuit 25 which is arranged to compare the peak value of the current field obtained from the peak detecting circuit 23 with the peak value of the preceding field obtained through the delay circuit 24 and to shift the photo-taking lens 1 by driving the motor 26 to rotate in the direction of offsetting any change detected by the comparison.

The third embodiment is thus arranged to detect for every field the peak value of the high-frequency component of the luminance signal corresponding to the inside area of the light measuring frame 101 which is arranged to serve also as a distance measuring frame; and to drive the photo-taking lens 1 to shift its position in such a way as to bring the detected peak value to a maximum value. In other words, the third embodiment performs the so-called hill climbing control.

By this arrangement, the lens 1 can be always and continuously focused on the object located inside the light measuring frame 101 which serves also as the distance measuring frame. The embodiment thus always performs adequate focus adjustment as well as optimum exposure control by tracing the object with the frame 101 even when the object moves. Further, the arrangement of the third embodiment may be changed to have a distance measuring frame and a tracing frame arranged separately from and in addition to the light measuring frame.

In each of the first, second and third embodiments of the invention, the size Of the light measuring frame may be arranged to be variable by controlling the gate pulse generating circuit 14 in accordance with an instruction from the control microcomputer 13 in such a way as to increase the luminance difference between the inside and outside areas EA and EB of the frame. This modification enables the embodiment to more accurately capture the object for more apposite exposure and focus control even when the size of the object's image changes on the image sensing plane.

As described in the foregoing, the automatic exposure control device according to the invention is arranged to set the light measuring frame on the image sensing plane; to automatically find whether the object to be photographed requires back-lighting compensation or wash-out compensation on the basis of the luminance signal parts obtained from the inside and the outside of the light measuring frame; and to cause the frame to trace a dark object for back-lighting compensation and to trace a white object for wash-out compensation, so that exposure control can be accomplished to optimize the exposure.

Exposure control is performed by tracing the object appearing on the image sensing plane with discrimination constantly made between dark and white states of the object's image. The invented arrangement thus always ensures optimum exposures to give natural images even in cases where a main photographed object moves within the image sensing plane or where the object changes from a back-lighting state to a washed-out state and vice versa.

A fourth embodiment of this invention is described below with reference to FIGS. 11 to 14.

Figure 11:
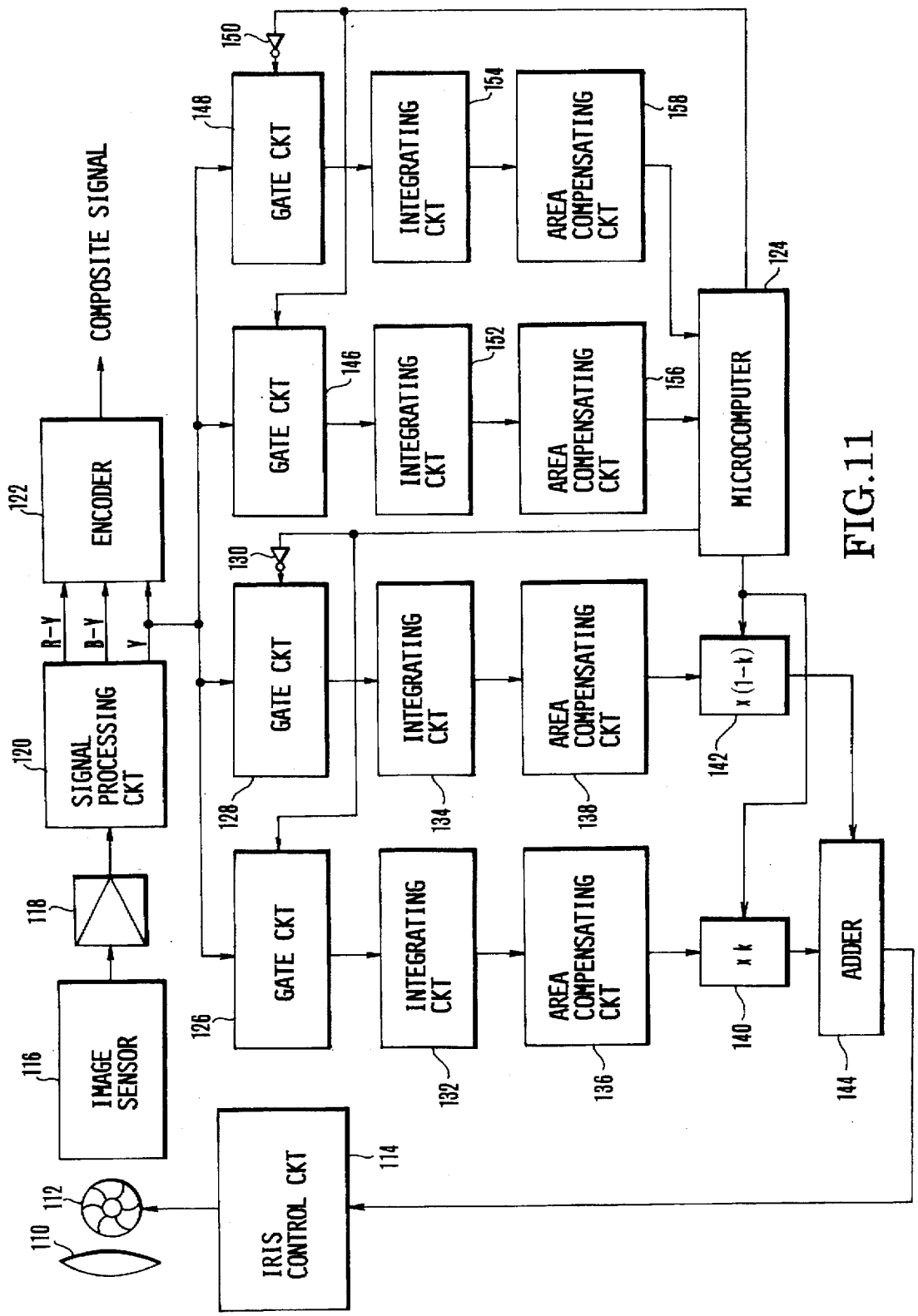
FIG. 11 is a block diagram showing the arrangement of a fourth embodiment of the invention.

FIG. 11 shows in a block diagram the arrangement of the fourth embodiment. The illustration includes a photo-taking lens 110; an iris 112; an iris control circuit 114 which is arranged to open and close the iris 112; an image sensor 116 which is, for example, a CCD or the like and is arranged to convert into an electrical signal an optical image formed on the image sensing plane thereof by the lens 110 and to product the electrical signal in the form of a video signal; a preamplifier 118; a signal processing circuit 120 which is arranged to perform a gamma correction, etc., on the output of the preamplifier 118 and to convert it into a luminance Signal Y and two color-difference signals R-Y and B-Y; and an encoder 212 which is arranged to convert a composite signal output from the signal processing circuit 120 into a composite signal conforming to the standards of the NTSC system, the PAL system or the like.

A microcomputer 124 is arranged to perform overall control over the light measuring action of the fourth embodiment. A gate circuit 126 is arranged to perform, in accordance with an instruction received from the microcomputer 124, a gate action on the signal output from the signal processing circuit 120 in such a way as to pass a part of the luminance signal Y corresponding to a light measuring area A defined by a light measuring frame EF set in a predetermined position on the image sensing plane (see FIG. 13). A gate circuit 128 is arranged to be caused by an inverter 130 to pass a part of the luminance signal Y corresponding to a light measuring area B (see FIG. 13) located outside of the light measuring frame EF. Integrating circuits 132 and 134 are arranged to integrate the outputs of the gate circuits 126 and 128 over the period of one field respectively. Area compensating circuits 136 and 138 are arranged to normalize the output of the integrating circuits 132 and 134 with the area values of the inside and outside areas of the light measuring frame for the purpose of making compensation for a difference between the integrated values resulting from an area size difference between the light measuring areas A and B. A coefficient multiplying circuit 140 is arranged to multiply the output of the area compensating circuit 136 by a variable coefficient k. Another coefficient multiplying circuit 142 is arranged to multiply the output of the area compensating circuit 138 by a variable coefficient (1−k). An adder 144 is arranged to add together the outputs of the coefficient multiplying circuits 140 and 142. The output of the adder 144 is supplied to the iris control circuit 114, which controls the iris 112 according to the output.

Figure 13:
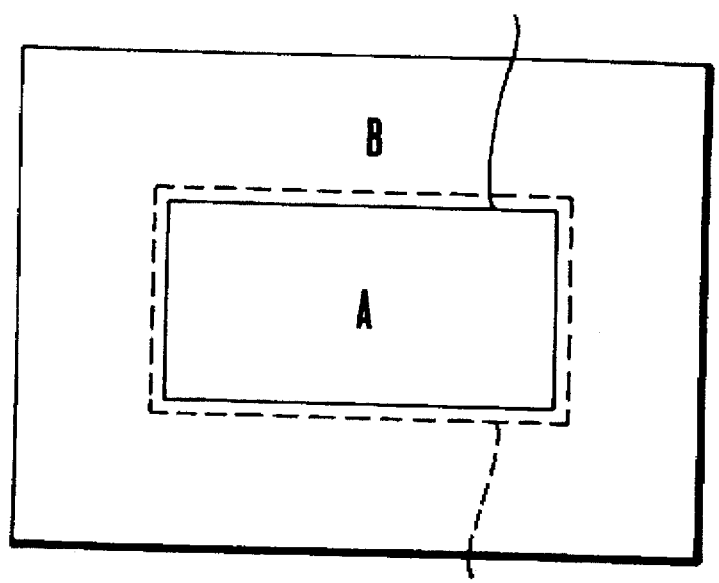
FIG. 13 shows the allocation on an image sensing plane of a tracing frame and a light measuring frame.

A gate circuit 146 is arranged to pass a part of the luminance signal corresponding to the inside area. (or a tracing area) of a tracing frame TF which is set as shown in FIG. 13 according to an instruction received from the microcomputer. A gate circuit 148 is arranged to be caused by an inverter 150 to a part of the luminance signal corresponding to the outside area of the tracing frame TF. Integrating circuits 152 and 154 are arranged to integrate the outputs of the gate circuits 146 and 148 over one field period respectively. Area compensating circuits 156 and 158 are arranged to normalize the outputs of the integrating circuits 152 and 154 with the area values of the inside and outside areas of the tracing frame TF respectively.

Figure 12:
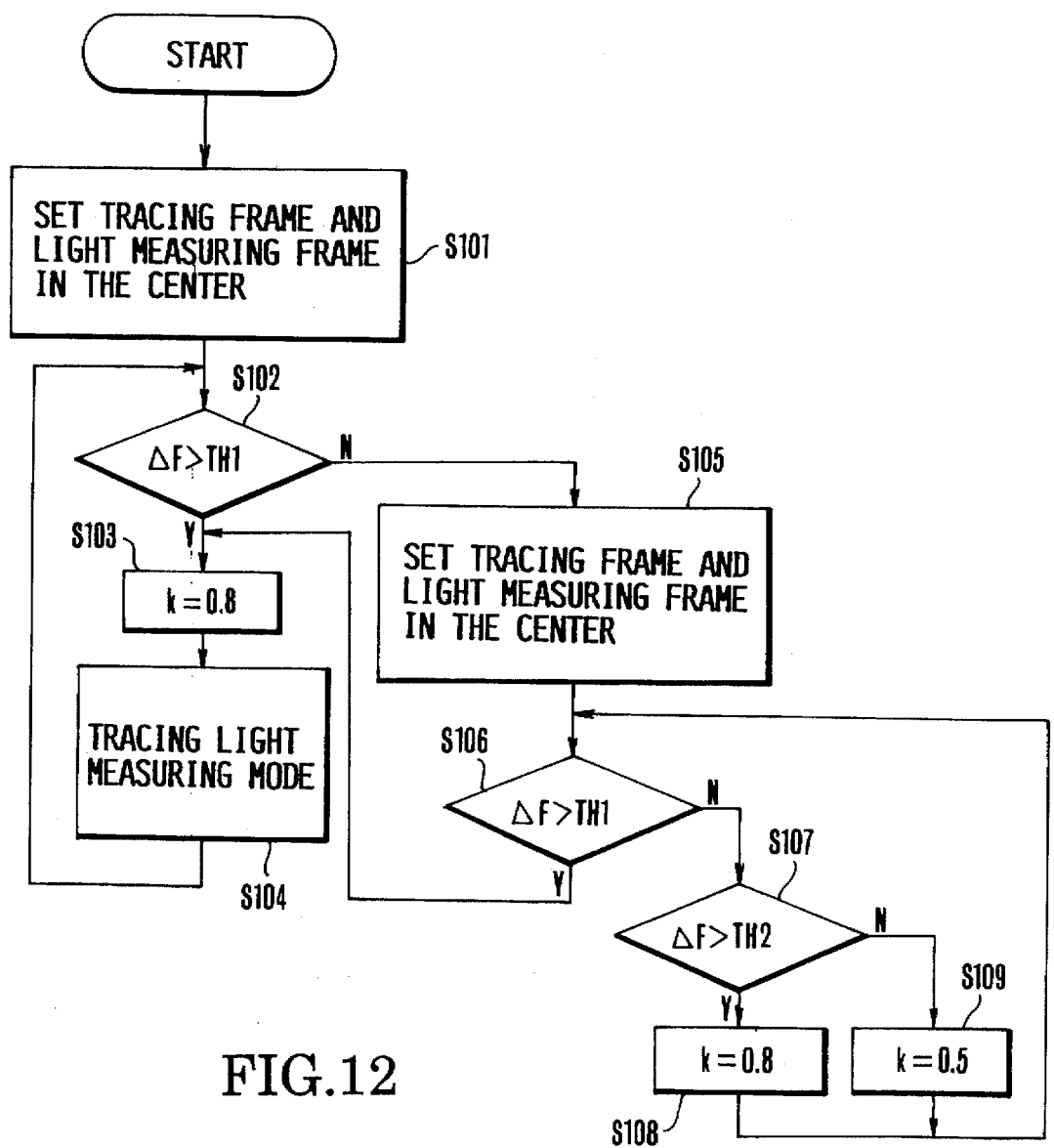
FIG. 12 is a flow chart showing the basic operation of the fourth embodiment shown in FIG. 11.
Figure 14:
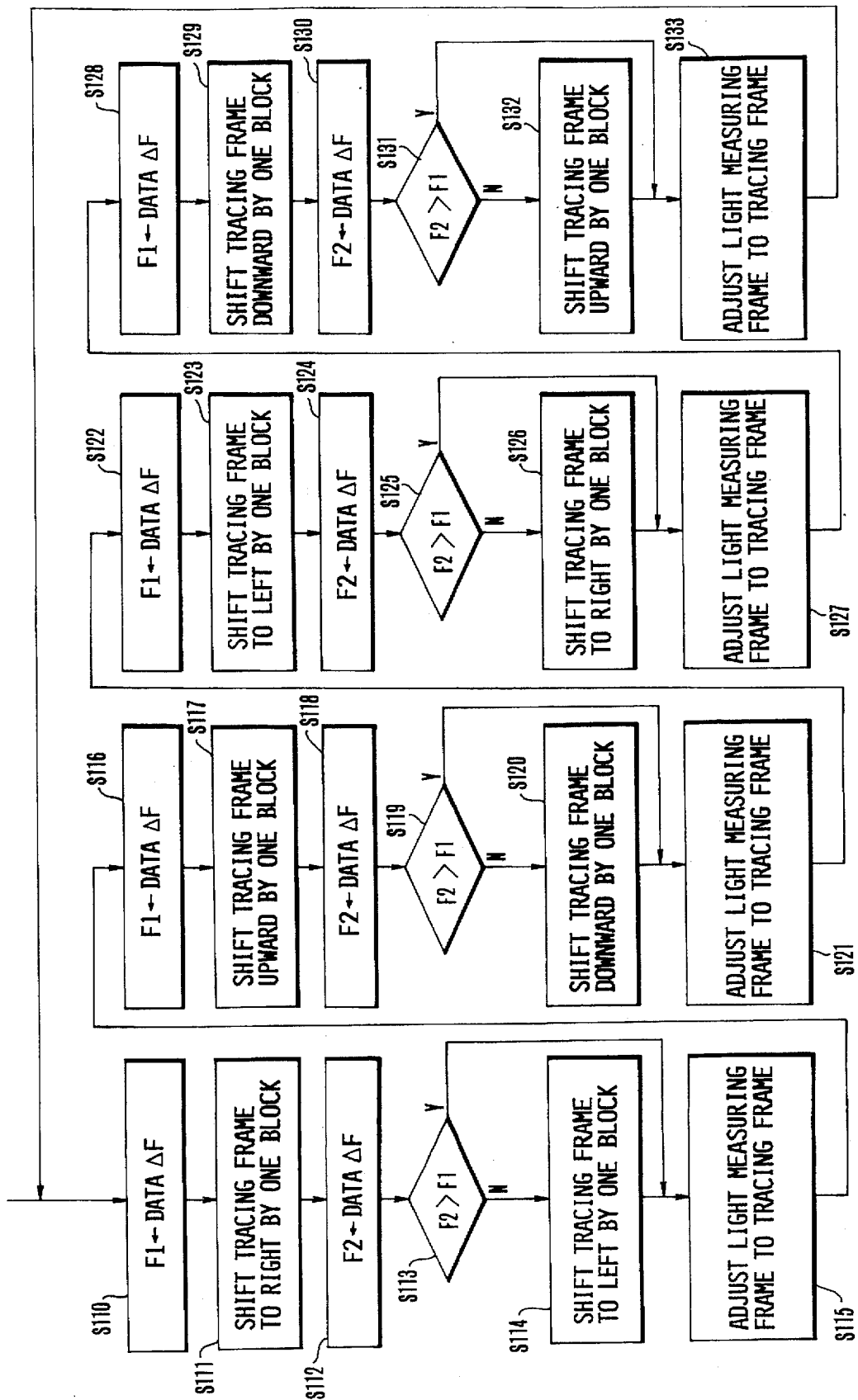
FIG. 14 is a flow chart showing an operation performed in a tracing mode.

Referring to FIGS. 12 and 14, the operation of the fourth embodiment shown in FIG. 11 is described as follows: FIG. 12 is a flow chart showing the basic operation of the device of FIG. 11. Referring to FIG. 12, when a power supply is switched on, the flow of operation begins as follows: at a step S101: The tracing frame TF and the light measuring frame EF are initially set in the central part of the image sensing plane as shown in FIG. 13. At a step S102: A difference ΔF in average video signal level between the inside and outside areas of the tracing frame TF is computed and obtained from the outputs of the area compensating circuits 156 and 158. The difference ΔF is equal to a difference between the outputs of the area compensating circuit 156 and 158. When the difference ΔF is larger than a predetermined threshold value TH1, thus indicating a great difference in the video signal level between the object and the background thereof, the flow proceeds to a step S103. At the step S103: The coefficient k to be used at the coefficient multiplying circuits 140 and 142 is set, for example, at 0.8. At a step S104: The tracing frame TF is shifted according to the position of the object and the light measuring mode is shifted to a tracing light measuring mode in which weight is attached to the object. As a result, the inside and Outside areas of the light measuring frame EF are weighted in the ratio of 8:2 and light measurement is performed with weight attached to the inside area of the frame EF. This tracing light measuring mode will be further described later.

If the difference ΔF is found to be smaller than the threshold value TH1 at the step S102, the flow comes to a step S105. At the step S105: The tracing frame TF and the light measuring frame EF are again set in the central part of the image sensing plane. At a step S106: Again the difference ΔF is taken in and compared with the threshold value TH1. If the difference ΔF is larger than the threshold value TH1, the flow comes to the step S103. If not, the flow comes to a step S107. Step S107: The difference ΔF is compared with another threshold value TH2 which is smaller than the first threshold value TH1. If the difference ΔF is found to be larger than the threshold value TH2, the flow proceeds to a step S108. Step S108: The coefficient k to be used by the coefficient multiplying circuits 140 and 142 is set at 0.8. The flow then comes back to the step S106. The light measuring frame EF has by then been set in the central part of the image sensing plane. Therefore, weight is attached to the video 'signal part corresponding to the central part of the image sensing plane. The device thus can be considered to be in the center-weighted light measuring mode. In a case where the difference ΔF is found to be smaller than the threshold value TH2 at the step S107, the flow comes to a step S109. Step S109: The coefficient k is set, for example, at 0.5 and the flow comes back to the step S106. At that time, the light measuring frame EF has been set in the central part of the image sensing plane and the inside and outside areas of the light measuring frame EF are weighted in the ratio of 1:1. Under this condition, the video signal of the whole image sensing plane is considered on the average. The device thus can be considered in the whole-plane average light measuring mode.

FIG. 14 is a flow chart showing the operation of the device in the tracing light measuring mode obtained at the step S104 of FIG. 12. The operation is performed in the same manner in principle as the first embodiment described in the foregoing. For example, the tracing frame TF is shifted upward, downward, to the left or to the right by one block among preset blocks. The absolute value of a difference in average luminance level between the inside and outside areas of the tracing frame TF is computed and obtained in each new position of the frame TF obtained by shifting it. The object to be photographed is considered to have moved to one of the shifted positions at which the luminance level difference becomes a maximum value. The light measurement is then carried out with weight attached to the video signal part obtained from the tracing frame TF. Referring to FIG. 14, the flow of operation is as follows: at a step S110: The above-stated difference ΔF is computed and is substituted for a variable F1. At a step S111: The tracing frame TF is shifted to the right by one block. At a step S112: The difference ΔF is again taken in to be substituted for a variable F2. At a step S113: The variables F1 and F2 are compared with each other. In the case of F2≦F1 indicating that the difference ΔF is not increased by the shift to the right, the flow proceeds to a step S114. At the step S114: The tracing frame TF is shifted to the left by one block. At a step S115: The position of the light measuring frame EF is adjusted to that of the tracing frame TF.

At steps S116 to S121: An upward shift by one block is attempted and the light measuring frame EF is shifted according to the result of the attempt. At steps S122 to S127: A leftward shift by one block is attempted. The light measuring frame EF is shifted according to the result of the attempt. At steps S128 to S133: A downward shift is attempted. The frame EF is shifted according to the attempt. After the step S133, the flow comes back to the step S110.

In the case of the fourth embodiment, the tracing frame TF and the light measuring frame EF are separately set, because: in this case, the tracing frame is caused to wobble and frequently shifted. If the light measuring frame is also frequently shifted in the same manner, it would give an unnatural impression. If such an unnatural impression is allowable, a single frame may be arranged to function as the two frames TF and EF. Further, the values of the coefficient k are not limited to the above-stated values.

As apparent from the above description, the fourth embodiment is capable of detecting the quantity of light in an optimum manner according to the photographing conditions, because: the embodiment is arranged to measure light with weight attached to the object by tracing the object only when a relatively large luminance difference between the object and the background thereof permits the tracing action on the object. In a case where the luminance difference between the object and the background is too small for tracing the object, the tracing action is not performed and the light measuring operation mode is switched either to the center-weighted light measuring mode or to the whole-plane average light measuring mode according to the degree of the luminance difference.

What is claimed is:

1. An automatic exposure control device comprising:
   a) light measuring area setting means for setting a light measuring area to a set position in a part of an image sensing plane, said light measuring area setting means further processing image signal levels corresponding to the inside and the outside of said light measuring area;
   b) discriminating means for discriminating a state of said image sensing plane on the basis of the processed image signal levels;
   c) exposure compensating means for making compensation for exposure conditions on the basis of a result of discrimination made by said discriminating means;
   d) object tracing means operable also on the basis of a result of discrimination by said discriminating means for causing displacement of the set position of said light measuring area to trace an object to be photographed at least for a period during which said exposure compensating means is in operation; and
   e) inhibiting means for inhibiting an operation of said object tracing means on the basis of the result of the discrimination.

2. A device according to claim 1, wherein said light measuring area setting means processes said image signal levels to obtain a difference between average signal levels inside and outside of said light measuring area and wherein said discriminating means is responsive to said difference to control operation of said exposure compensating means.

3. A device according to claim 1, wherein said exposure compensating means is operable in a back-lighting compensating mode, a wash-out compensating mode or an average light measuring mode and is arranged to select one of said modes as the operating mode of said exposure compensation means on the basis of an output of said discriminating means.

4. A device according to claim 3, wherein said light measuring area setting means computes an average signal level of the inside of said light measuring area and an average signal level of the outside of said light measuring area and obtains the difference between said levels and wherein said discriminating means result causes operation of said exposure compensating means in said wash-out compensating mode when said difference is less than a predetermined value.

5. A device according to claim 3, wherein said light measuring area setting means computes an average signal level of the inside of said light measuring area and an average signal level of the outside of said light measuring area and obtains the difference between said levels and wherein said discriminating means result causes operation of said exposure compensating means in said back-lighting compensating mode when said difference is greater than a predetermined value.

6. A device according to claim 3, wherein said light measuring area setting means computes an average signal level of the inside of said light measuring area and an average signal level of the outside of said light measuring area and obtains the difference between said levels and wherein said. discriminating means result causes operation of said exposure compensating means in said average light measuring mode when said difference is greater than or equal to one predetermined value and less than or equal to a second predetermined value.

7. A device according to claim 3, wherein said light measuring area setting means computes an average signal level of the inside of said light measuring area and an average signal level of the outside of said light measuring area and obtains the difference between said levels and wherein said discriminating means result causes operation of said exposure compensating means in said wash-out compensating mode when said difference is less than a first predetermined value, in said back-lighting compensating mode when said difference is greater than a second predetermined value, and in said average light measuring mode when said difference is greater than or equal to said first predetermined value and less than or equal to said second predetermined value.

8. A device according to claim 1, wherein said exposure compensating means makes exposure compensation by varying degrees of weight to be attached to said image signals.

9. A device according to claim 2, wherein said object tracing means is operable to shift a position of said light measuring area in a direction in which said difference increases.

10. A device according to claims 5, 6, or 9, wherein said object tracing means is arranged to cause said light measuring area to trace the object seized within said light measuring area when said difference in said average signal levels between the inside and the outside of said light measuring area is determined by said discriminating means to have a prescribed relation to a preselected value.

11. A device according to claims 5, 6, or 9, wherein said object tracing means is arranged to cause said light measuring area to trace the object seized within said light measuring area when said difference in said average signal levels between the inside and the outside of said light measuring area is determined by said discriminating means to have a prescribed relation to a preselected value and is further operative to bring an object tracing action to a stop when said difference in said average signal levels between the inside and the outside of said light measuring area is determined by said discriminating means not to have said prescribed relation to said preselected value.

12. An automatic exposure control device comprising:
   a) light measuring area setting means for setting a light measuring area to a set position in a part of an image sensing plane;
   b) light measuring means for detecting image signals and average signal levels of said image signals from said image sensing plane which respectively correspond to the inside and the outside of said light measuring area;
   c) computing means for computing said average signal levels to discriminate an exposure condition and for outputting a control signal for use in controlling an iris of a photo-taking optical system;
   d) compensating means for compensating the control signal by varying degrees of weight to be attached to said image signals according to the exposure condition;
   e) object tracing means for operable shifting said light measuring area on said image sensing plane from said set position to other positions to trace an object to be photographed; and
   f) control means for controlling inhibit an operation of said object tracing means on the basis of the exposure-condition.

13. A device according to claim 12, wherein said image signals are video signals and wherein said light measuring means is operative to detect average luminance signal levels which respectively correspond to the inside and the outside of said light measuring area.

14. A device according to claim 12, wherein said compensating means is arranged to add together said image signals by attaching respective predetermined of said degrees of said weight to said image signals.

15. A device according to claim 14, wherein said computing means computes said difference between said average signal levels and provides said computing means control signal on the basis of said difference.

16. A device according to claim 15, further including an iris controller and wherein said compensating means provides an iris controller input signal by increasing the degree of weight to be attached to the image signal corresponding to the inside of said light measuring area when said computing means determines said difference to indicate that the average signal level inside of said light measuring area is greater than the average signal level outside of said light measuring area by less than one predetermined value.

17. A device according to claim 16, wherein said compensating means provides said iris controller input signal by increasing the degree of weight to be attached to the image signal corresponding to the inside of said light measuring area when said computing means determines said difference to indicate that the average signal level outside of said light measuring area is greater than the average signal level inside of said light measuring area by not less than a second predetermined value.

18. A device according to claim 12, wherein said compensating means has a back-lighting compensating mode and selects said back-lighting compensating mode when said computing means determines said difference to indicate that the average signal level inside of said light measuring area is greater than the average signal level outside of said light measuring area by less than one predetermined value.

19. A device according to claim 18, wherein said compensating means further has a wash-out compensating mode and selects said wash-out compensating mode when said computing means determines said difference to indicate that the average signal level outside of said light measuring area is greater than the average signal level inside of said light measuring area by not less than a second predetermined value, said second predetermined value being larger than said one predetermined value.

20. A device according to claim 12, wherein said compensating means has an average light measuring mode wherein said image signals are used without weighting of either thereof, said compensating means selecting said average light measuring mode when said computing means determines said difference to indicate that the average signal level inside of said light measuring area is greater than the average signal outside of said light measuring area by an amount equal to or exceeding one predetermined value.

21. A device according to claim 20, wherein said compensating means selects said average light measuring mode when said computing means determines said difference to indicate that the average signal level inside of said light measuring area to be greater than the average signal outside of said light measuring area by an amount equal to or less than a second predetermined value, said second predetermined value being larger than said one predetermined value.

22. A device according to claim 12, wherein said control means causes said object tracing means to shift said light measuring area in a direction according to which said difference in average signal level between the inside and the outside of said light measuring area increases.

23. A device according to claim 22, wherein said control means is arranged to operate said object tracing means when said computing means determines said difference to indicate that the average signal inside of said light measuring area is greater than the average signal level outside of said light measuring area by not less than one predetermined value.

24. A device according to claim 23, wherein said control means is arranged to operate said object tracing means when said computing means determines said difference to indicate that the average signal level inside of said light measuring area is greater than the average signal level outside of said light measuring area by not less than a second predetermined value, said second predetermined value being larger than said one predetermined value.

25. An exposure control device comprising:

a) image sensing means for converting into an image signal an image of an object formed on an image sensing plane by a photo taking-optical system to output said image signal;

b) area setting means for setting a light measuring area of said image sensing plane and for shifting said light measuring area from the set position to different positions on said image sensing plane;

c) light measuring means for detecting image signal levels inside and outside of said light measuring area and discriminating a condition of a light distribution in said image sensing plane;

d) exposure control means having a plurality of operating modes which exposure control characteristics are different from each other for controlling exposure on said image sensing plane for said object image; and e) control means responsive to said image signal levels detected by said light measuring means for controlling said area setting means to shift said light measuring area in such a way as to increase a difference between image signal levels corresponding to the inside and the outside of said light measuring area respectively and for selecting an operating mode of said exposure control means, said control means adaptively determining a feature of the object to be traced by said light measuring area on the basis of the condition of light distribution discriminated by said light measuring means.

26. A device according to claim 25, wherein said plurality of light measuring modes includes an average light measuring mode in which exposure of said image sensing plane is controlled by said exposure control means on the basis of an average image signal level obtained from the whole of said image sensing plane and a weighted light measuring mode in which exposure control is performed by said exposure control means on the basis of a weighting of an image signal obtained from the inside of said light measuring area in said set position thereof.

27. A device according to claim 26, wherein said control means is operative to select said average light measuring mode with said light measuring area set in a fixed position on said image sensing plane, to select said weighted light measuring mode with said light measuring area set in a fixed position on said image sensing plane, or to select said weighted light measuring mode with said light measuring area moved to a position other than a fixed position.

28. A device according to claim 27, wherein said control means includes difference circuit means for providing indication of a difference between video signal levels inside and the outside of said light measuring area, and selects said weighted light measuring mode when said difference is less than a first threshold value or greater than a second threshold value and selects said average light measuring mode when said difference is equal to or greater than said first threshold value or equal to or less than said second threshold value.

29. An automatic exposure control device comprising:
  (a) light measuring area setting means for setting a plurality of light measuring areas on an image sensing plane;
  (b) detecting means for detecting image signal levels corresponding to said light measuring areas, respectively; and
  (c) exposure control means arranged to discriminate a state of the image sensing plane on the basis of a result of processing of the image signal levels of the respective light measuring areas detected by said detecting means and to select and execute an optimum one of a plurality of exposure control modes in response to a result of the discrimination, wherein said plurality of exposure control modes includes a first mode for detecting a change of an object on said image sensing plane on the basis of an output of said detecting means and to shift positions occupied by said light measuring areas on said image sensing plane and a second mode for inhibiting the operation of the first mode and fixedly setting said light measuring areas at predetermined positions respectively on said image sensing plane.

30. A device according to claim 29, wherein said light measuring area setting means sets a light measuring frame on said image sensing plane and said plurality of light measuring areas are an inside area and an outside area of said frame.

31. A device according to claim 30, wherein said exposure control means discriminates the state of the image sensing plane on the basis of the difference of signal levels corresponding to inside and outside of said frame.

32. A device according to claim 30, wherein said exposure control means is operable in a back-lighting compensating mode, a wash-out compensating mode, or an average light measuring mode and selects one of said modes as the operating mode of said exposure control means on the basis of the state of the image sensing plane.

33. A device according to claim 31, wherein said exposure control means detects a change of an object on said image sensing plane on the basis of said difference and controls a position of said light measuring area on said image sensing plane so that said difference increases.

34. An automatic exposure control device comprising:
  a) area setting means for setting a plurality of light measuring areas on an image sensing plane;
  b) light measuring means for detecting signal levels of image signals respectively corresponding to said plurality of said light measuring areas;
  c) computing means for computing said signal levels to output a control signal for controlling an exposure state of image sensing plane and for discriminating a condition of light distribution on said image sensing plane;
  d) compensating means for compensating the operation of said computing means by varying degrees of weight to be attached to said image signals;
  e) shifting means for changing the set position of said light measuring area on said image sensing plane according to a movement of an object to be photographed; and
  f) control means responsive to said light measuring means for controlling operations of said compensating means and said shifting means and controlling and prohibiting operation of said shifting means according to the condition of light distribution.

35. A device according to claim 34, wherein said compensating means is operable in a back-lighting compensating mode, a wash-out compensating mode or an average light measuring mode and selects one of said modes as the operating mode of said compensation means on the basis of an output of said light measuring means.

36. A device according to claim 34, wherein said plurality of light measuring areas include an inside area and an outside area of the light measuring frame set on the image sensing plane, and said compensating means is arranged to set a normal-lighting compensating mode when the average luminance level at the inside of said light measuring frame is higher than the average luminance level at the outside of said light measuring frame by a predetermined value, to set a back-lighting compensating mode when the average luminance level at the outside of said light measuring frame is higher than the average luminance level at the inside of said light measuring frame by a predetermined value, and to set an average light measuring mode when a difference between the average luminance level at the inside of said light measuring frame and the average luminance level at the outside of said light measuring frame is lower than the predetermined value.

37. A device according to claim 34, wherein said compensating means is capable to set an object tracing mode for shifting said light measuring frame in response to an object when the difference between the average luminance level at the inside of said light measuring frame and the average luminance level at the outside of said light measuring frame is equal to or higher than the predetermined value and said compensating means prohibits the object tracing mode when said difference is lower than the predetermined value.

38. An image sensing device comprising:
  a) image sensing means for converting an image formed on an image sensing plane to an image signal;
  b) setting means for setting a plurality of detecting areas on said image sensing plane;
  c) detecting means for detecting image signals output from said image sensing means respectively corresponding to said plurality of detecting areas;
  d) computing means for computing said image signals to output a control signal for controlling an image sensing operation;
  e) compensating means for compensating the operation of said computing means by varying degrees of weight to be attached to said image signals corresponding to said plurality of detecting areas;
  f) shifting means for operable changing the set position of said detecting areas on said image sensing plane according to a variation of the image on said image sensing plane; and
  g) control means responsive to said detecting means for controlling operation of said compensating means and said shifting means, said control means including a mode of operating the compensating means while operating said shifting means and another mode of operating said compensating means while inhibiting the operation of said shifting means.

39. An apparatus according to claim 38, wherein the detecting areas include areas at the inside and the outside of one detecting frame and said shifting means is arranged to shift: said detecting frame in such direction that the difference of the luminance level between the outside and the inside of said detecting frame is increased.

40. An apparatus according to claim 38, wherein said compensating means is exposure compensating means, and said control means includes a mode of operating the compensating means while operating said shifting means and another mode of operating said compensating means while holding said shifting means in not-operating state.

41. An automatic exposure control device, comprising:

a) area setting means for setting a predetermined detecting area on an image sensing plane;

b) exposure control means for controlling an exposure on the basis of a luminance level of an image signal corresponding to the predetermined area on said image sensing plane; and c) area control means having a first mode in which said area changes so as to follow a low luminance portion on said image sensing plane and a second mode in which said area changes so as to follow a high luminance portion on said image sensing plane and selecting said first and second mode on the basis of a luminance condition on the image sensing plane.

42. A device according to claim 41, wherein said area control means is arranged to change over said first mode and said second mode in response to a difference of luminance level between the inside and the outside of said area.

43. A device according to claim 41, wherein said area control means is arranged to set a third mode in which said area is set at a substantially central predetermined position in said image sensing plane and the change thereof is prohibited when the difference of luminance level between the inside and the outside of said area is lower than a predetermined value.

44. A device according to claim 43, wherein said exposure control means is arranged to effect a center weighted light measuring operating when said first mode or said second mode is selected and to effect an average light measuring operation when said third mode is selected.

45. A device according to claim 43, wherein said exposure control means is capable of effecting a back-lighting compensation when said first mode is selected and a wash-out compensation when said second mode is selected.

* * * * *

UNITED STATES PATENT AND TRADEMARK OFFICE
CERTIFICATE OF CORRECTION

PATENT NO. : 5,677,733

DATED : October, 14, 1997

INVENTOR(S) : Yoshimura et al.

It is certified that error appears in the above-identified patent and that said Letters Patent are hereby corrected as shown below:

| | | |
|---|---|---|
| Col. 2, line 62, | delete "General" and insert -- general --. |
| Col. 12, line 2, | delete "Of" and insert -- of --. |
| Col. 12, line 44, | delete "Signal" and insert -- signal --. |
| Col. 13, line 16, | after "to" insert -- pass --. |
| Col. 13, line 47, | delete "Outside" and insert -- outside --. |
| Col. 14, line 2, | delete "'signal" and insert -- signal --. |
| Col. 16, line 65, | after "controlling" insert -- to --. |
| Col. 20, line 65, | delete "shift:" and insert -- shift --. |

Signed and Sealed this

Seventh Day of April, 1998

Attest:

BRUCE LEHMAN

Attesting Officer

Commissioner of Patents and Trademarks